(12) United States Patent  
Garrett et al.

(10) Patent No.: US 8,873,040 B2
(45) Date of Patent: Oct. 28, 2014

(54) RAMAN APPARATUS AND METHOD FOR REAL TIME CALIBRATION THEREOF

(71) Applicant: Mustard Tree Instruments, LLC, Research Triangle Park, NC (US)

(72) Inventors: Brian Garrett, Cary, NC (US); Todd Blonshine, Cary, NC (US); W. Stanley Ayers, Cary, NC (US)

(73) Assignee: Mustard Tree Instruments, LLC, Research Triangle Park, NC (US)

( * ) Notice: Subject to any disclaimer, the term of this patent is extended or adjusted under 35 U.S.C. 154(b) by 0 days.

(21) Appl. No.: 13/743,457

(22) Filed: Jan. 17, 2013

(65) Prior Publication Data

US 2013/0188182 A1 Jul. 25, 2013

Related U.S. Application Data (60) Provisional application No. 61/588,439, filed on Jan. 19, 2012.

(51) Int. Cl.
*G01J 3/44* (2006.01)
*G01J 3/02* (2006.01)
*G01J 3/28* (2006.01)

(52) U.S. Cl.
CPC .................. *G01J 3/44* (2013.01); *G01J 3/0213* (2013.01); *G01J 3/28* (2013.01)
USPC ........................................................ 356/301

(58) Field of Classification Search
USPC .............................................. 356/301, 72–73
See application file for complete search history.

(56) References Cited

U.S. PATENT DOCUMENTS

| | | | |
|---|---|---|---|
| 6,563,854 B2 * | 5/2003 | Tedesco | 372/102 |
| 7,898,656 B2 * | 3/2011 | Yun et al. | 356/300 |
| 8,027,033 B2 * | 9/2011 | Lipson et al. | 356/301 |
| 2009/0040516 A1 * | 2/2009 | Fritz et al. | 356/301 |
| 2012/0099102 A1 * | 4/2012 | Bello | 356/301 |

* cited by examiner

*Primary Examiner* — Abdullahi Nur
(74) *Attorney, Agent, or Firm* — Coats & Bennett, PLLC (57) ABSTRACT

A Raman spectrometer optically separates an optical signal scattered by a sample from an incident excitation light beam into an unshifted return component at a first wavelength and one or more Raman scattered components at shifted wavelengths characteristic of the sample. The unshifted return component—but not the Raman scattered components—is attenuated prior to impinging on an optical detector. The unshifted return then serves as the basis for real-time calibration to account for fluctuations in optical intensity, wavelength shift, and/or spectral peak width, based on a comparison of the unshifted return peak to a reference standard for stable reflectance.

21 Claims, 10 Drawing Sheets

FIG. 9B

RAMAN APPARATUS AND METHOD FOR REAL TIME CALIBRATION THEREOF

This application claims priority to U.S. Provisional Patent Application Ser. No. 61/588,439, filed Jan. 19, 2012, titled, "Raman Apparatus and Method for Real Time Calibration Thereof," the disclosure of which is incorporated herein by reference in its entirety.

FIELD OF INVENTION

The present invention relates generally to Raman spectroscopy, and in particular to and apparatus and method of Raman spectroscopy that attenuates an unshifted return signal, allowing the corresponding spectral peak to serve as the basis of a calibration method.

BACKGROUND

Raman spectroscopy is an analytic instrumentation methodology useful in ascertaining and verifying the molecular structures of materials. Raman spectroscopy relies on inelastic scattering, or Raman scattering, of monochromatic light incident on a sample. Raman scattering results in an energy shift in a portion of the photons scattered by a sample. From the shifted energy of the Raman scattered photons, vibrational modes characteristic to a specific molecular structure can be ascertained. This is the basis of using Roman spectroscopy to ascertain the molecular makeup of a sample. In addition, by analytically assessing the relative intensity of Raman scattered photons, the purity of a sample can be determined.

Typically, a sample is illuminated with a laser beam. Light reflected/scattered by the sample is collected by lenses and analyzed. Most of the reflected light is at wavelengths close to the laser line, which are due to elastic Rayleigh scattering. A small fraction of the collected light consists of Raman scattered photons. These selected bands of the collected light are directed onto a detector for quantitative analysis.

The Raman effect occurs when light impinges upon a molecule and interacts with the electron cloud and the bonds of that molecule. For the spontaneous Raman effect, which is a form of light scattering, a photon excites the molecule from its ground state to a virtual energy state. The energy state is referred to as virtual since it is temporary, and not a discrete (real) energy state. When the molecule relaxes, it emits a photon and it returns to a different rotational or vibrational state. The difference in energy between the original state and this new state leads to a shift in the emitted photon's frequency away from the excitation wavelength.

If the final vibrational state of the molecule is more energetic than the initial state, then the emitted photon will be shifted to a lower frequency in order for the total energy of the system to remain balanced. This shift in frequency is known as a Stokes shift. If the final vibrational state is less energetic than the initial state, then the emitted photon will be shifted to a higher frequency, which is known as an anti-Stokes shift. An optical signal containing Stokes or anti-Stokes shifted photons is referred to herein as a Stokes or anti-Stokes scatter, respectively. Both are forms of Raman scattering. Raman scattering is an example of inelastic scattering because of the energy transfer between the photons and the molecules during their interaction.

The pattern of shifted frequencies is determined by the rotational and vibrational states of the sample, which are characteristic of the molecules. The chemical makeup of a sample may thus be determined by quantitative analysis of the Raman scattering.

Conventional Raman spectroscopy relies on a complex, sensitive, carefully calibrated optical system comprising a laser providing a source beam; an array of photodetectors for detecting Stokes and anti-Stokes shifted photons; optics, including lenses, mirrors, and optical filters; and data processing systems. Conventional Raman spectroscopy systems are maintained in a controlled environment, such as a laboratory.

A standing challenge in Raman spectroscopy is achieving a high signal-to-noise ratio in the detection and analysis of Raman scattered photons. The vast majority of photonic return from illuminating a sample with a laser is unshifted in frequency from the incident light. This unshifted return may comprise photons resulting from specular reflection, diffuse reflection, Mie scatter, and/or Rayleigh scatter—collectively referred to herein as "unshifted return." The unshifted return typically swamps the Stokes and anti-Stokes components, which are at wavelengths that are shifted in frequency from the incident laser. A need exists in the art for a reliable way to detect, amplify, and process the Raman scattered, or shifted, photonic energy returned from illuminating a sample, in the presence of unshifted return.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, a Raman spectrometer optically separates an optical signal scattered by a sample from an incident excitation light beam into an unshifted return component at a first wavelength and one or more Raman scattered components at shifted wavelengths characteristic of the sample (e.g., Stokes and/or anti-Stokes scattered components). The unshifted return component—but not the Raman scattered components—is attenuated prior to impinging on an optical detector. The unshifted return then serves as the basis for real-time calibration to account for fluctuations in optical intensity, frequency shift, and/or spectral peak width, based on a comparison of the unshifted return peak to a reference standard for stable reflectance.

In greater detail, a Raman spectrometer emits light from a light source at a first wavelength toward a sample area containing a sample. The sample produces unshifted return, as well as Stokes and anti-Stokes scattered return, which are collectively directed to a wavelength dispersive device. The wavelength dispersive device spatially separates the scattered light into an unshifted return component at a first wavelength and one or more of Stokes and anti-Stokes components at shifted wavelengths characteristic for the sample. The separated components—unshifted return, Stokes, and anti-Stokes scatter—are directed to a detector configured to receive the spatially separated light. A dampening element is positioned in the optical path upstream of the detector, and configured such that the unshifted return scatter is attenuated before impinging on the detector, while the Stokes and/or anti-Stokes scatter impinge upon the detector without passing through the dampening element. In this manner, the SNR of the Raman scattered photons is increase, relative to the unshifted return.

One embodiment relates to a Raman spectrometer. The Raman spectrometer includes a light source operative to generate an excitation beam, and a sample area operative to hold a sample such that the excitation beam impinges the sample. The spectrometer also includes a wavelength dispersive device operative to separate an optical signal reflected from or scattered by the sample into an unshifted return component and one or more Raman scattered components. The spectrometer further includes an optical detector operative to receive and detect optical signal components from the wavelength dispersive device, and an optical dampening element interposed between the wavelength dispersive device and the detector, and operative to selectively attenuate the unshifted return component and not attenuate a Raman scattered component.

Another embodiment relates to a method of calibrating a Raman spectrometer for intensity fluctuations. The Raman spectrometer is operative to attenuate an unshifted return component of an optical signal scattered by a sample and not attenuate a Raman scattered component of the optical signal. A reference for standard reflectance of the sample is determined and stored. The sample is illuminated with an excitation light beam. An optical signal scattered by the sample is separated into an unshifted return component and one or more Raman scattered components. The position and intensity of a spectral peak corresponding to the unshifted return component of the optical signal is determined. The intensity of the unshifted return peak is compared to the intensity of the reference. Based on the comparison, it is determined whether adjustments to the intensity of spectral peaks corresponding to Raman scattered components of the optical signal are required.

Yet another embodiment relates to a method of calibrating a Raman spectrometer for frequency fluctuations. The Raman spectrometer is operative to attenuate an unshifted return component of an optical signal scattered by a sample and not attenuate a Raman scattered component of the optical signal. A reference for standard reflectance of the sample is determined and stored. The sample is illuminated with an excitation light beam. An optical signal scattered by the sample is separated into an unshifted return component and one or more Raman scattered components. The position and intensity of a spectral peak corresponding to the unshifted return component of the optical signal is determined. The position of the unshifted return peak is compared to that of the reference. Based on the comparison, it is determined whether adjustments to the positions of spectral peaks corresponding to Raman scattered components of the optical signal are required.

Still another embodiment relates to a method of calibrating a Raman spectrometer for peak width. The Raman spectrometer is operative to attenuate an unshifted return component of an optical signal scattered by a sample and not attenuate a Raman scattered component of the optical signal. A reference for standard reflectance of the sample is determined and stored. The sample is illuminated with an excitation light beam. An optical signal scattered by the sample is separated into an unshifted return component and one or more Raman scattered components. The width of a spectral peak corresponding to the unshifted return component of the optical signal is determined. The width of the unshifted return peak is compared to that of the reference. Based on the comparison, it is determined whether the spectrometry run should be terminated with an error.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
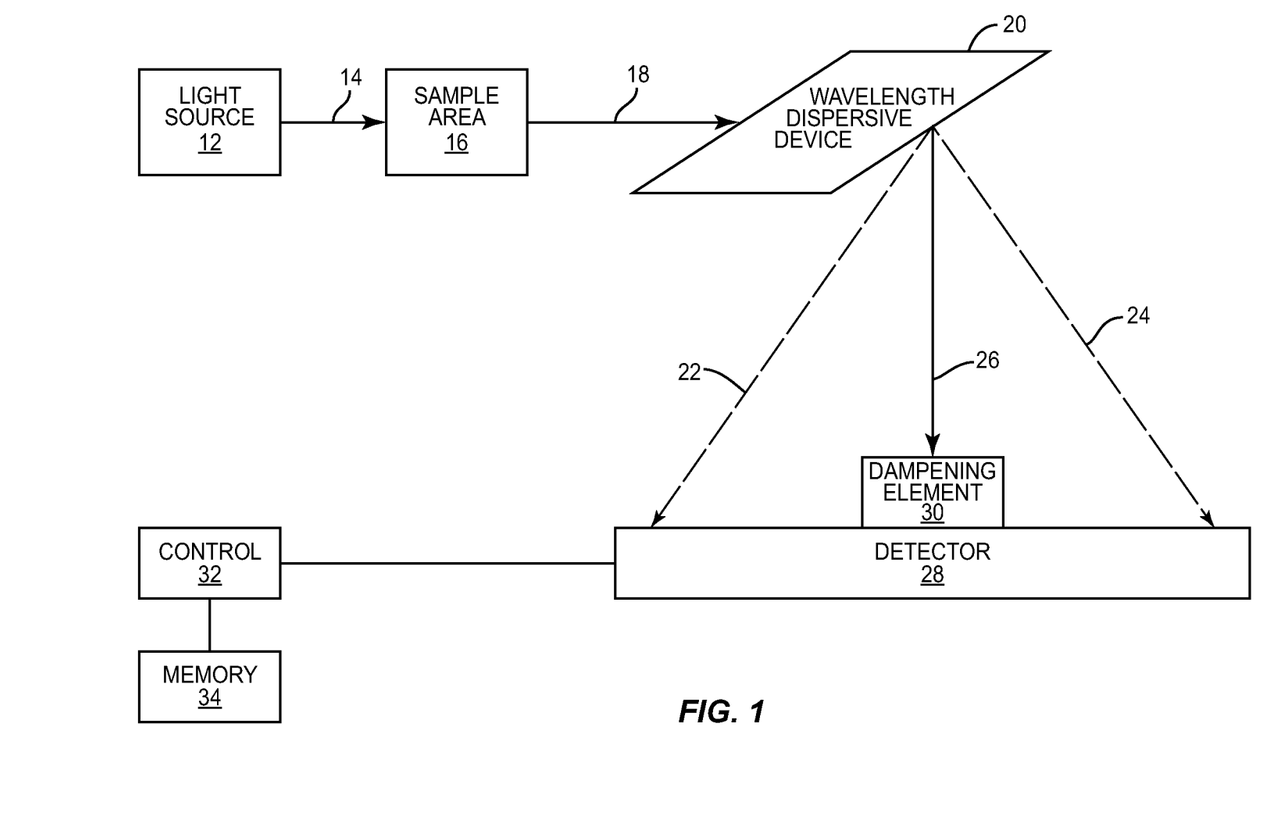
FIG. 1 is a functional block diagram of a Raman spectrometer.

FIG. 1 depicts a representative embodiment of a Raman spectrometer apparatus 10. The apparatus 10 includes a light source 12 emitting an excitation beam 14, which is directed to a sample area 16. Optical energy 13 scattered from the sample is separated into components 22, 24, 26 by a wavelength dispersive device 20. The separated optical components 22, 24, 26 impinge on a detector 28, and a control circuit 32 reads and analyzes the optical spectra, storing data to, and retrieving programs and data from, memory 34 as necessary. A dampening element 30 is positioned over the detector 28 to selectively attenuate one of the optical components 26. These elements are described below in greater detail.

A monochromatic light source 12 is configured to emit a collimated, temporally coherent, excitation light beam 14 at a first wavelength. The light sources 12 may comprise a laser, such as a gas discharge tube laser, a crystal laser, semiconductor laser, or the like. In one embodiment, the light source 12 is a 785 nm, single mode, VBG stabilized, temperature controlled ±0.1° C. laser diode.

The excitation beam 14 travels to a sample area 16. In the embodiment depicted in FIG. 1, all optical beams and optical signals travel through free space. However, in other embodiments, one or more of the various optical beams, signals, or components described herein may travel in a waveguide, such as optical fiber. The sample area 16 holds a Raman-compatible sample material in position for measurements. In some embodiments, the sample area 16 may include a mount or other means for holding a receptacle containing a sample, such as a cuvette, bottle, or the like, in position.

The excitation beam 14 impinges upon a sample in the sample area 16, and generates and optical signal 18 of scattered light that includes one or more of unshifted return, Stokes scattered photons, and anti-Stokes scattered photons. The optical signal 18 travels (through free space in the embodiment of FIG. 1) to a wavelength dispersive device 20. The wavelength dispersive device 20 spatially separates the optical signal 18 into components by wavelength, such that the anti-Stokes 22 and Stokes 24 photonic energy is separated from the unshifted return 26. The wavelength dispersive device 20 may comprise a diffractive grating, reflective grating, or prism. In one embodiment, a suitable wavelength dispersive device 20 is a holographic-gelatin filled holographic transmission grating, available from Wasatch Photonics of Durham, N.C.

An optical detector 28 is positioned such that the unshifted return 26, the anti-Stokes scatter 22, and the Stokes scatter 24 optical components, having been spatially separated by the wavelength dispersive device 20, all impinge on different parts of the operative face of the detector 28. The optical detector 28 may comprise a charge-coupled device (CCD), complementary metal oxide semiconductor (CMOS) sensor, silicon sensors, silicon diode array, InGaAs sensor, or photomultiplier tube array. In one embodiment, a suitable optical detector 28 is a Hamamatsu14020, which is a 2048×64 pixel back-thinned, back illuminated CCD, available from Hamamatsu Photonics K.K. of Hamamatsu City, Japan.

A dampening element 30 is positioned over the detector 28 such that the unshifted return 26 passes through the dampening element 30 before impinging upon the detector 28. However, the anti-Stokes 22 and Stokes 24 scatter components do not pass through the dampening element 26, but rather impinge directly on the detector 28. This increases the SNR of the Raman scattered signals 22, 24 relative to the unshifted return 26. The dampening element 30 may comprise an optical filter, such as a neutral density (ND) filter, or narrow line filter. In one embodiment, a suitable dampening element 30 is an ND6 optical filter.

Figure 2:
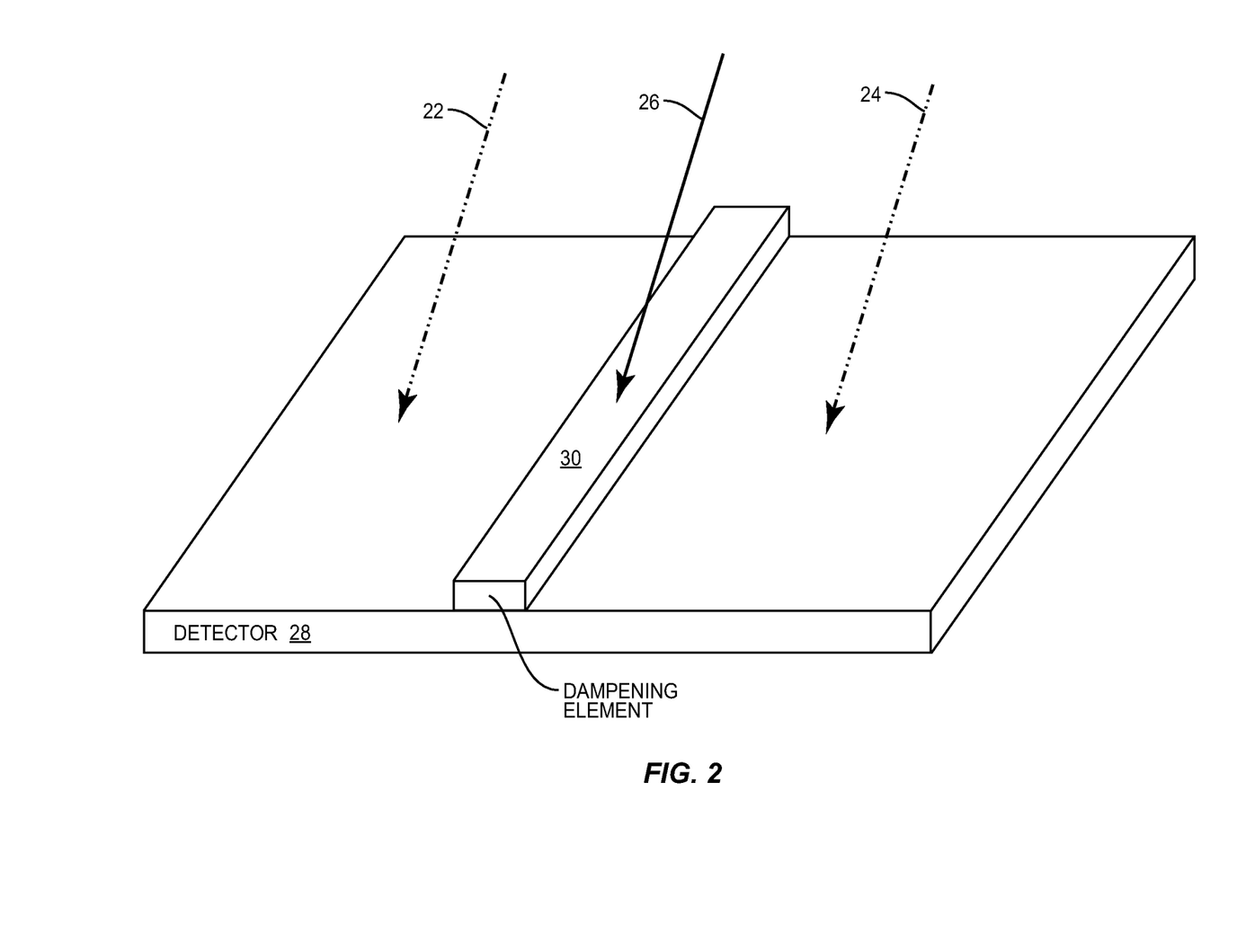
FIG. 2 is a perspective view of a detector and optical dampening element.

FIGS. 1 and 2 illustrate the dampening element 30 positioned along a central region of the detector 28. In some embodiments, the locations at which the separated anti-Stokes 22 scatter, Stokes 24 scatter, and unshifted return 26 fall on the detector 28 may be selectively varied, such as by spatial adjustment, when the spectrometer apparatus is not collecting sample data. In these embodiments, the dampening element 30 is moveable along the face of the detector 28 such that the dampening element 30 corresponds with the position at which the unshifted return 26 falls on the face of the detector 28.

Figure 3:
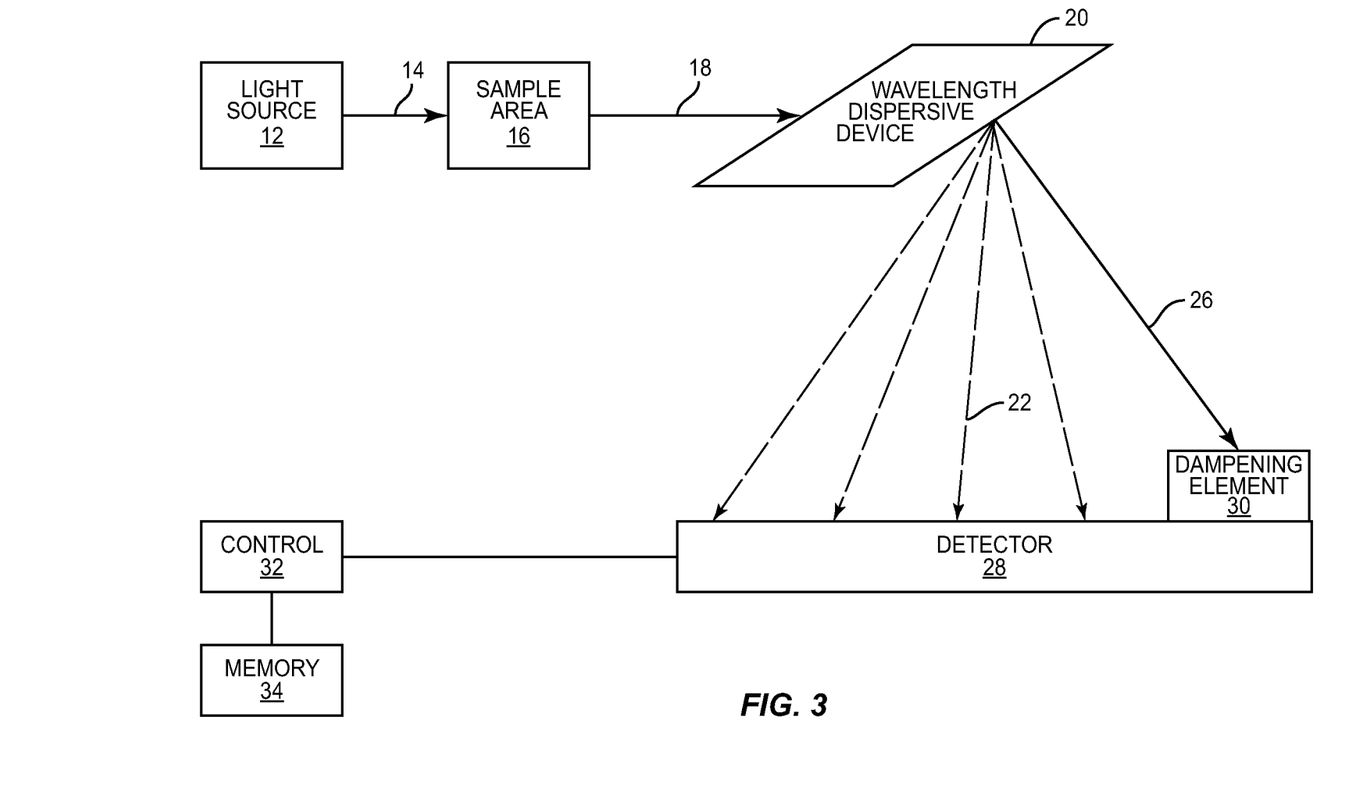
FIG. 3 is a functional block diagram of a Raman spectrometer.

FIG. 3 depicts an example embodiment, in which there is a need to investigate only anti-Stokes scatter 22. In this case, the location at which the unshifted return scatter 26 impinges on the detector 28 is shifted to just after the zero location on the detector 18, so that more anti-Stokes scatter 22 can be collected. The dampening element 30 is shifted so that it dampens the unshifted return signal 26, but not the anti-Stokes scatter 22. As depicted in FIG. 3, in this embodiment the unshifted return signal 26, and hence also the dampening element 30, are shifted to just after a zero location on the operative face of the detector 28.

FIGS. 1 and 2 illustrate embodiments in which the optical signal 18 includes unshifted return 26, anti-Stokes scatter 22, and Stokes scatter 24. In other embodiments, the optical signal 18 may include unshifted return 26 and different numbers of other beams of scattered photons. For example, in the embodiment depicted in FIG. 3, the scattered light 18 includes unshifted return 26 and only one other type of scatter, in this case anti-Stokes scatter 22.

A control circuit 32 is operatively connected to the detector 28 and configured to control the overall operation of the Raman spectrometer apparatus 10. Memory 34 is operatively connected to the control circuit 32.

Figure 4:
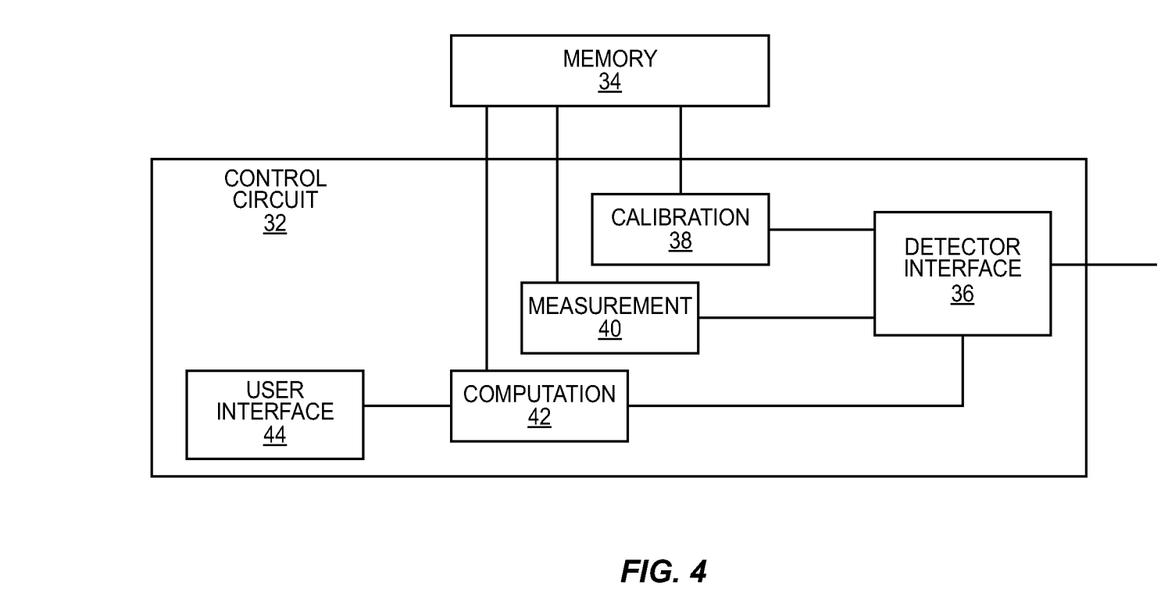
FIG. 4 is a block diagram of a control circuit.

FIG. 4 depicts representative functional blocks or modules within the control circuit 32, including a detector interface 36, calibration module 38, measurement module 40, computation module 42, and user interface 44. The detector interface 36 includes the circuits necessary to drive the detector 28, and to extract data therefrom. The calibration module 38 performs calibration of the detector 28, and/or data retrieved from the detector 28, if necessary. The measurement module 40 controls the detector 28 during Raman spectroscopy operations, to measure photonic energy impinging the detector 28 at various wavelengths 22, 24, 26. The computation module 42 performs analysis of the measured results obtained by the measurement module 40. In the embodiment depicted in FIG. 4, the measurement module 40 stores measurement results to memory 34, and the computation module 42 reads measured data from memory 34 as required. In other embodiments, data may pass directly from the measurement module 40 to the computation module 42.

The control circuit 32 includes at least one processor. In one embodiment, one or more of the calibration module 38, measurement module 40, and computation module 42 may be implemented as a separate, appropriately-programmed processor. In other embodiments, two or more of the modules 38, 40, 42 may be implemented as software modules executing on the same processor. A processor in the control circuit 32 may comprise any sequential state machine operative to execute machine instructions stored as machine-readable computer programs in the memory 34, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above.

The memory 34 may comprise any non-transient machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like. The memory 34 may include non-volatile memory for the persistent storage of operating system and program software, calibration data, reference standards, and the like.

The user interface 44 provides resources for interactive control of the Raman spectrometer apparatus 10. The user interface may include one or more keyboards, keypads, touchscreen, pointer device (e.g., mouse), microphone, disc drive, USB port, or other input means. The user interface may include one or more display screens, indicator lights, speakers, printer, plotter, disc drive, USB port, or other output means. The user interface may include a wireless interface to a computer or computer network, allowing for remote control and operation, and the direct transfer of data to remote data processing resources.

Figure 5:
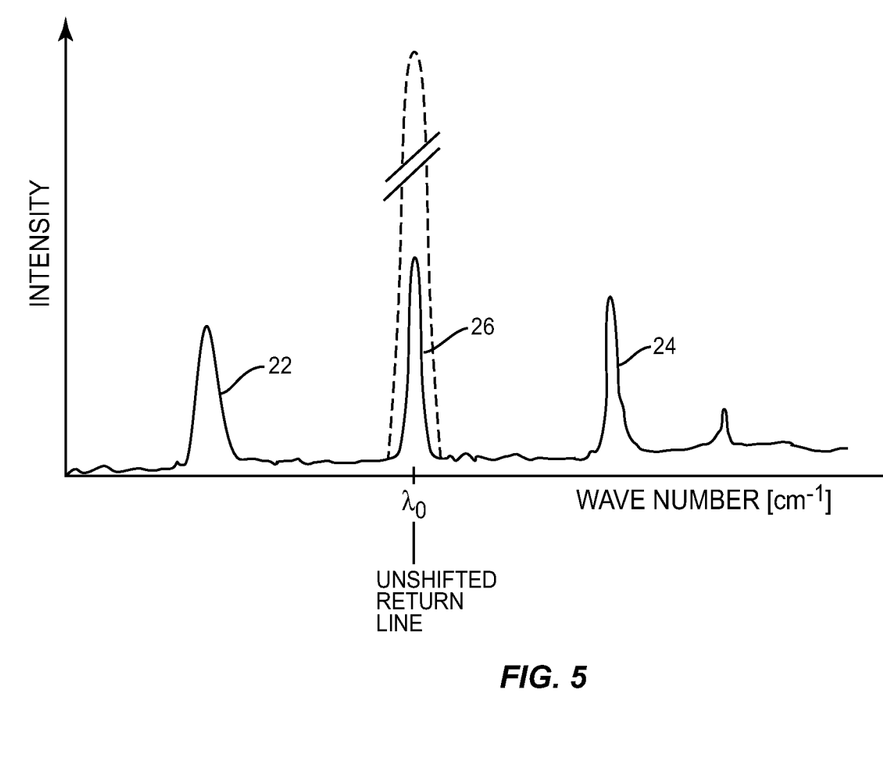
FIG. 5 is a graph of Raman spectra.

Representative Raman spectra are depicted in FIG. 5. Raman shifts, or scatter, are typically described as wavenumbers, which have units of inverse length. A wavenumber relates to frequency shift by $$\Delta w = \left( \frac{1}{\lambda_0} - \frac{1}{\lambda_1} \right)$$

where
  w is the wavenumber;
  $\lambda_0$ is the wavelength of the excitation laser beam 14; and
  $\lambda_1$ is the wavelength of the Raman scattered photon.

FIG. 5 depicts, in dashed lines, a prominent peak representing the unshifted return 26, at the same wavelength $\lambda_0$ as the excitation beam 14, as it would register in a conventional Raman spectrometer. The unshifted return 26 peak, referred to herein as the "unshifted return line," in the Raman spectrometer apparatus 10 is depicted (at the same wavenumber, of course) in a solid line. The unshifted return line is attenuated, relative to the conventional case, by operation of the dampening element 30.

In one embodiment, the Raman spectrometer apparatus 10 uses the unshifted return line as a wavelength reference to perform real-time calibration. The position or intensity of the peaks in the spectrum could shift as a result of mode hopping, vibrations, or shifts in laser temperature or power. By dampening the unshifted return scatter 26 before it impinges on the detector 28 while at the same time not dampening the Stokes 22 and anti-Stokes scatter 24, the unshifted return line may be used as an internal standard to conduct real time calibration.

Figure 6:
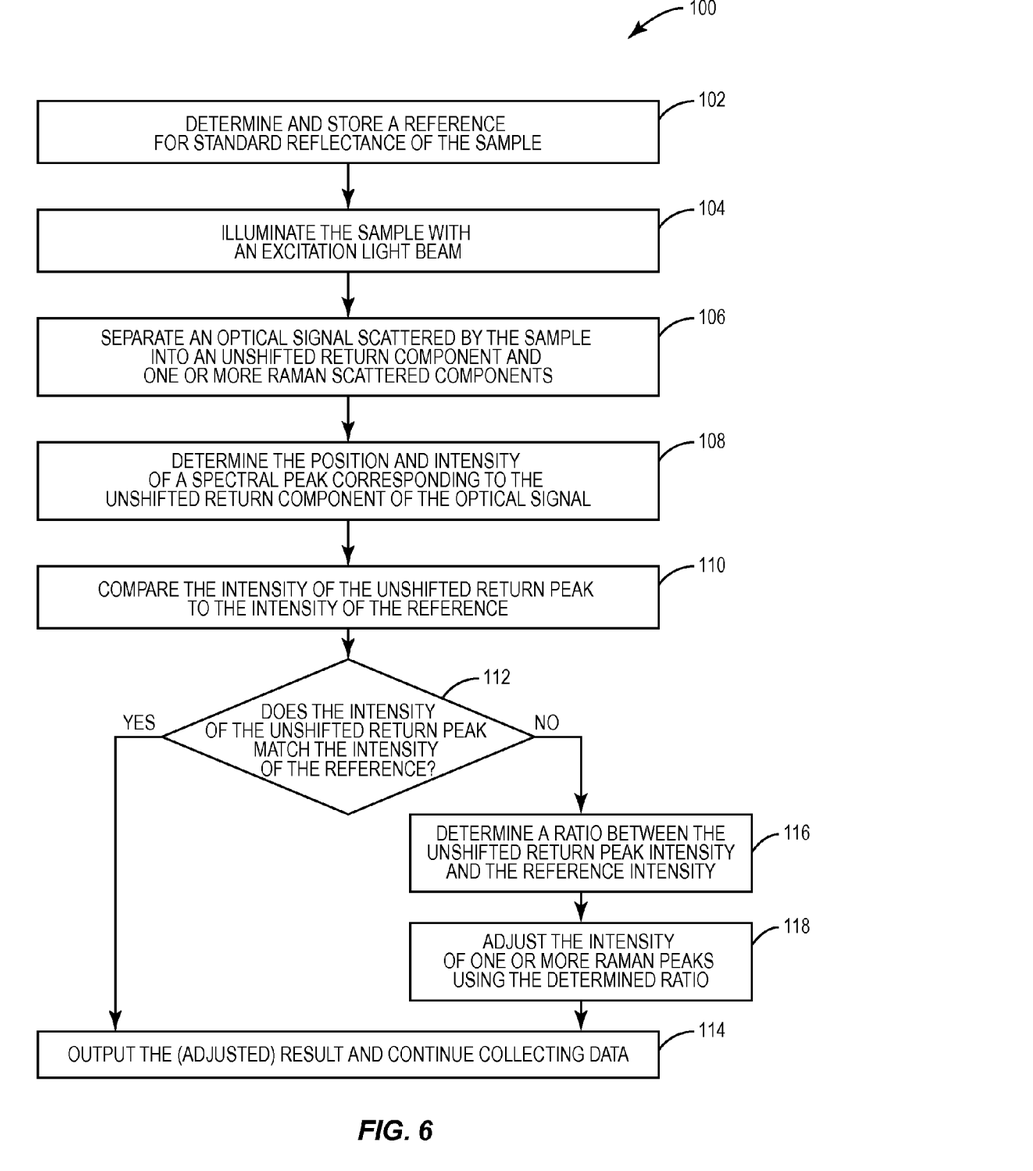
FIG. 6 is a flow diagram of a method of peak intensity calibration.

FIG. 6 depicts a method 100 of performing a calibration to account fluctuations in peak intensity. Prior to collecting data, a reference standard for stable reflectance is determined and stored in memory 34 (block 102). By definition, the reference standard should be at the zero shift position relative to an approved Raman shift standard. In one embodiment, a suitable Raman shift standard is the ASTM E1840 shift standard. The determined reference standard is saved in a library database in the memory 34. In one embodiment, the reference standard is measured as an x-y coordinate pair, where the x coordinate represents the CCD pixel location converted to wave number and the y coordinate represents the number of photons detected at that CCD pixel location. In another embodiment, the reference standard is measured as an x-y coordinate pair where the x coordinate represents the CCD pixel location converted to frequency and the y coordinate represents the number of photons detected at that CCD pixel location. In some embodiments, the y-coordinate, corresponding to the number of photons, is translated into an intensity value.

A sample is selected and placed in the sample area 16, and the excitation beam 14 is directed to impinge on the sample (block 104). After the unshifted return 26 and Raman signals 22, 24 are separated by the wavelength dispersive device 20 (block 106), the position and intensity of the unshifted return line are determined (block 108). In one embodiment, the position and intensity of the unshifted return line are saved as an x-y coordinate pair. In one embodiment, the x coordinate may refer to the CCD pixel location converted to wave number, while in another embodiment the x-coordinate may refer to the CCD pixel location converted to frequency. In one embodiment, the y coordinate corresponds to the number of photons, while in another embodiment the y coordinate corresponds with the number of photons translated to an intensity value. Although it is preferred to determine both the position and intensity of the unshifted return line, in some embodiments, the position of the unshifted return line may not be separately determined. In these embodiments, for example, the intensity at the position corresponding to the pre-determined reference standard could be determined. In real time, the intensity of the unshifted return line from the sample is compared against the reference standard (block 110).

If the intensity of unshifted return line matches that of the reference standard for stable reflectance (block 112), then no correction to the Raman peak measurements needs to be made, and the measured intensity for the spectrum is output and data collection then continues (block 114). In various embodiments, what constitutes an intensity match may vary. For example, depending on the experimental factors necessary for a particular spectroscopy run, a match may be found when there is an exact equivalence, or alternatively a match may be found when the returned data differs from the reference standard by less than predetermined threshold values.

If the intensity at the unshifted return line does not match the reference standard for stable reflectance (block 112), then a ratio is calculated representing the change between the stored intensity value for the standard and the measured unshifted return line intensity (block 116). Because the relationship for the change in intensity is linear, the ratio for the change in unshifted return line intensity will apply equally to the change in intensity for all collected Raman peaks. This ratio may be utilized to adjust the data for the Raman peak heights (block 118). The adjusted data is then returned as measurement output, and data collection continues (block 114).

As one non-limiting example of the method 100 in operation, assume that during a data collection run, the excitation laser beam 14 power decreases by half. As a result, the intensity of the corresponding unshifted return peak decreases by half. The unshifted return peak intensity is compared with the standard reference (block 110). Because the two are not equivalent (block 112), the ratio corresponding to the decrease is calculated (block 116). Since the unshifted return peak is one half of the intensity of the standard, the Raman peaks are also one half the intensity at which they should appear. The intensities of the Raman peaks are adjusted to account for the intensity change by doubling the peak intensity output (block 118), and the proper intensity values for the sample are output (block 114).

Figure 7:
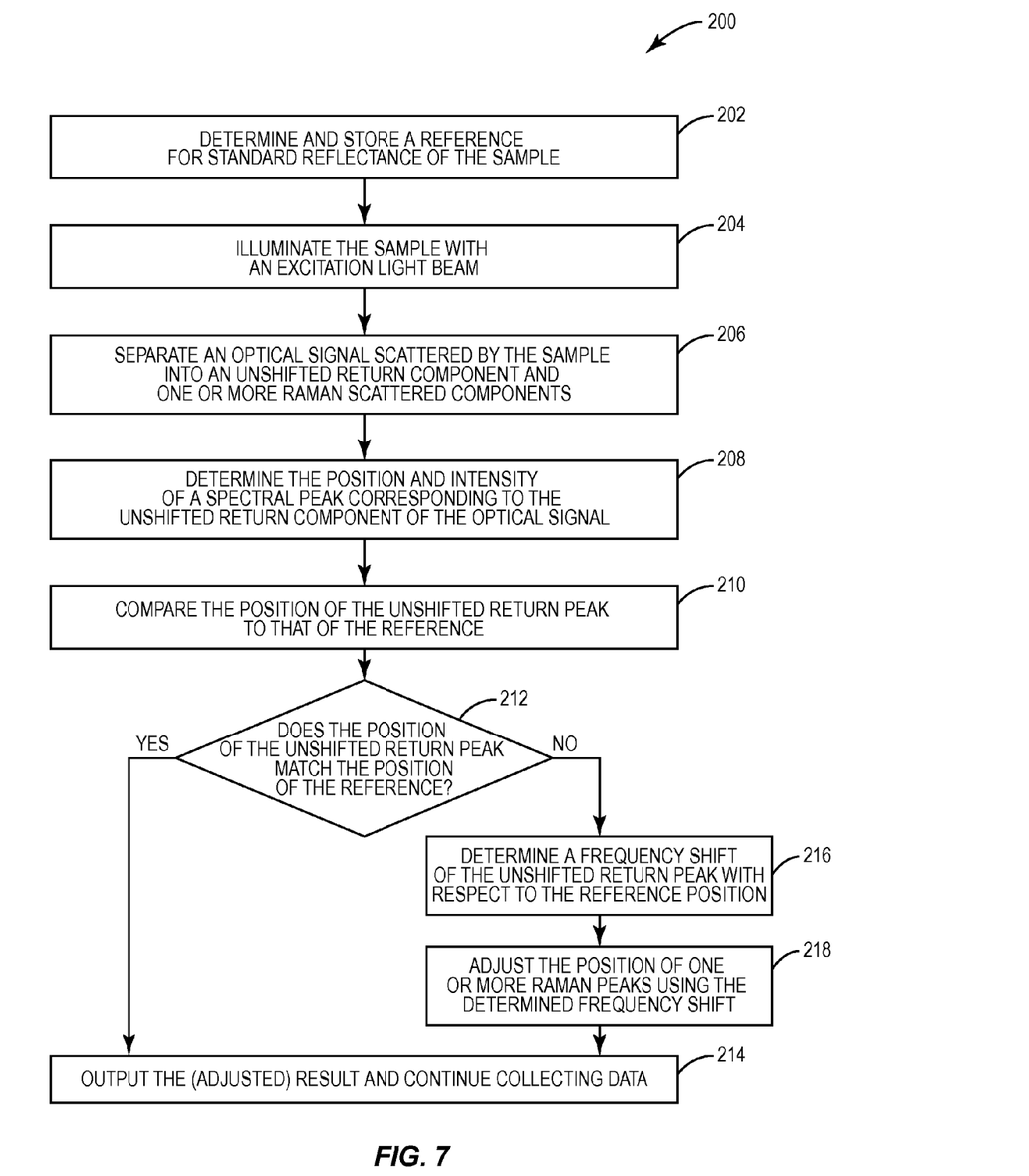
FIG. 7 is a flow diagram of a method of peak position calibration.

Similarly, it is possible to determine whether a wavelength shift in the spectrum occurs, which could cause important Raman data to appear in the wrong locations and produce inaccurate results. FIG. 7 depicts a method 200 of calibration to account fluctuations in wavelength shift. Prior to collecting data, a reference standard for stable reflectance is determined and stored in memory 34 (block 202). The reference standard may be as described above with respect to the method 100 of calibration for intensity fluctuation. The determined reference standard is saved in a library database in the memory 34.

A sample is selected and placed in the sample area 16, and the excitation beam 14 is directed to impinge on the sample (block 204). After the unshifted return 26 and Raman signals 22, 24 are separated by the wavelength dispersive device 20 (block 206), the position and intensity of the unshifted return line are determined (block 208). In real time, the position of the unshifted return line from the sample is compared against the position for the reference standard (block 210).

If the position of unshifted return line matches the position of the reference standard for stable reflectance (block 212), then no wavelength shift has occurred and no correction to the Raman peak measurements is necessary. The measured positions for the spectrum are output and data collection then continues (block 214). In various embodiments, what constitutes a position match may vary. For example, depending on the experimental factors necessary for a particular spectroscopy run, a match may be found when there is an exact equivalence, or alternatively a match may be found when the position of the returned data differs from that of the reference standard by less than predetermined threshold values.

If the position of the unshifted return line does not match the position of the reference standard for stable reflectance (block 212), then the shift in position between the reference standard and the unshifted return line is calculated (block 216). The shift in the unshifted return line is indicative of the shift in the position of the peaks in the Raman spectrum. The new positions for the Raman peaks, based upon the shift in the unshifted return line, are then calculated (block 218). This adjusted data is returned as output, and data collection continues (block 214).

Figure 8:
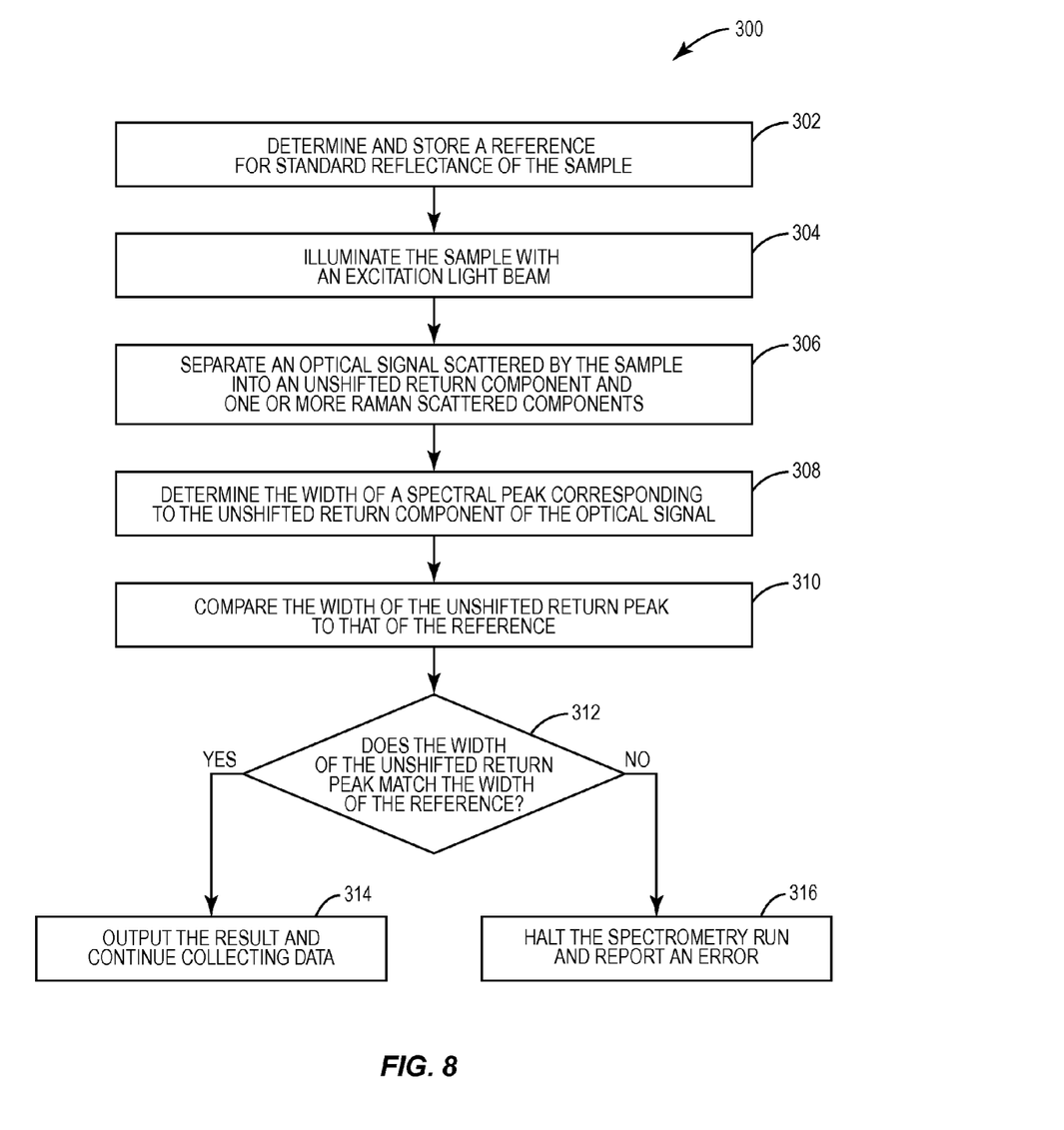
FIG. 8 is a flow diagram of a method of peak width calibration.

It is also possible to determine whether a peak width variation occurs. The distribution around a Raman peak is indicative of the characteristics of the power of the excitation laser beam 14, the health of the laser source 12 and other spectrometer electronics, and the optical path(s). FIG. 8 depicts a method 300 of determining whether a peak width variation has occurred. Prior to collecting data, a reference standard for stable reflectance is determined and stored in memory 34 (block 302). The reference standard may be as described above with respect to the method 100 of calibration for intensity fluctuation. In one embodiment, the reference standard may include a series of x coordinates representative of the width of the reference standard peak. The determined reference standard is saved in a library database in the memory 34.

A sample is selected and placed in the sample area 16, and the excitation beam 14 is directed to impinge on the sample (block 304). After the unshifted return 26 and Raman signals 22, 24 are separated by the wavelength dispersive device 20 (block 306), the position, width, and intensity of the unshifted return line are determined (block 308). Although it is preferred to determine all three of these variables, in some embodiments only one more such variable may be analyzed. In real time, the width of the unshifted return line from the sample is compared against the width for the reference standard (block 310).

If the width of unshifted return line matches the width of the reference standard for stable reflectance (block 312), then no variation in peak width has occurred, and no correction to the Raman peak measurements is necessary. The measured data for the peaks of the Raman spectrum are output and data collection then continues (block 314). Depending on the experimental factors necessary for a particular spectroscopy run, a match may be found when there is an exact equivalence, or alternatively a match may be found when the returned data differs from that of the reference standard by less than predetermined threshold values.

If the width of the unshifted return line does not match the width of the reference standard for stable reflectance (block 312), then data collection should cease until the system is calibrated, to prevent the collection of inaccurate data (block 316).

Figure 9A:
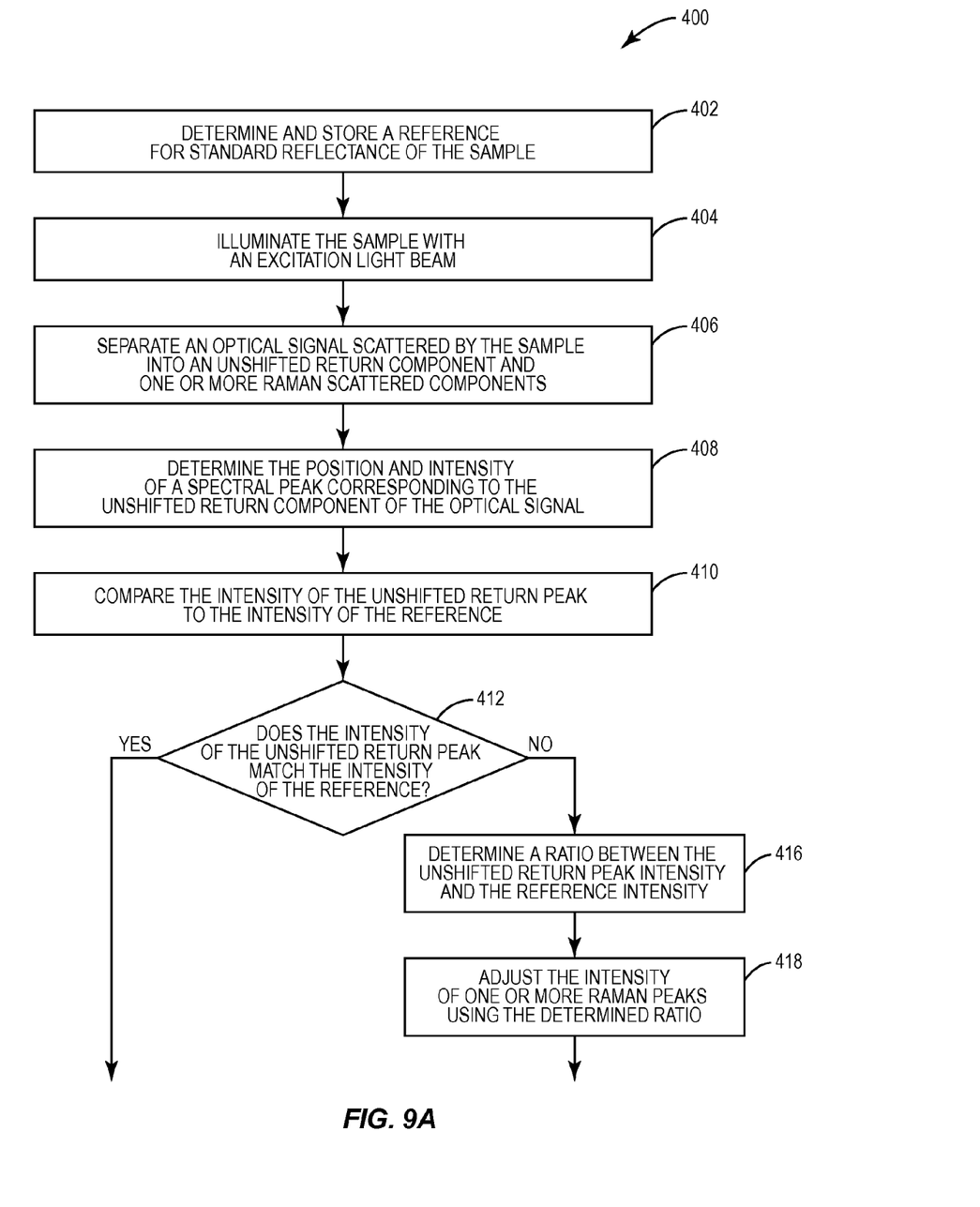
FIGS. 9A and 9B are a flow diagram of a method of both peak intensity and position calibration.
Figure 9B:
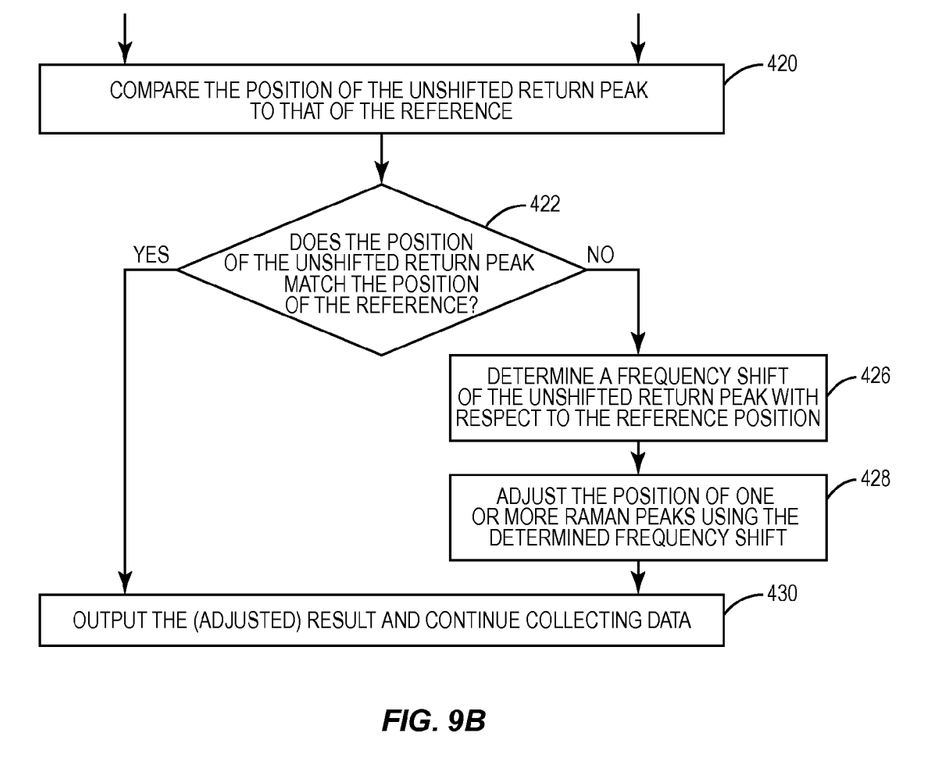

The three methods 100, 200, 300 for real-time calibration based upon the variations in unshifted return intensity, position, and width may be combined in numerous ways. As one example, FIG. 9 depicts a method 400 combining real-time calibrations of position and intensity. Prior to collecting data, a reference standard for stable reflectance is determined and stored in memory 34 (block 402). The reference standard may be as described above with respect to the method 100 of calibration for intensity fluctuation. In various embodiments, the reference standard may comprise x and y coordinates indicative of peak intensity, position, and/or width, as described above. The determined reference standard is saved in a library database in the memory 34.

A sample is selected and placed in the sample area 16, and the excitation beam 14 is directed to impinge on the sample (block 404). After the unshifted return 26 and Raman signals 22, 24 are separated by the wavelength dispersive device 20 (block 406), the position and intensity of the unshifted return line are determined (block 408). In real time, the intensity of the unshifted return line from the sample is compared against the intensity for the reference standard (block 410).

If the intensity at the unshifted return line does not match the reference standard for stable reflectance (block 412), then a ratio is calculated representing the change between the stored intensity value for the standard and the measured unshifted return line intensity (block 416). Depending on the experimental factors necessary for the run, a match may be found when there is an exact equivalence or a match may be found when the difference in intensity falls within pre-defined threshold values. Because the relationship for the change in intensity is linear, the ratio for the change in unshifted return line intensity will apply equally to the change in intensity for all collected Raman peaks. This ratio may is utilized to adjust the data for the Raman peak heights (block 418).

If the intensity at the unshifted return line matches the reference standard for stable reflectance, then no correction to the Raman peak measurements is required.

After comparing the intensity for the unshifted return line against the standard, a comparison is made between the position of the unshifted return line from the sample against the position for the reference standard (block 420).

If the position of the unshifted return line does not match the position of the reference standard for stable reflectance (block 422), then the shift in position between the reference standard and the unshifted return line is calculated (block 426). The shift in the unshifted return line is indicative of the shift in the position of the peaks in the Raman spectrum. The new positions for the Raman peaks, based upon the shift in the unshifted return line, are then calculated (block 428). This adjusted data is returned as output, and data collection continues (block 430).

If the position of the unshifted return line matches the position of the reference standard for stable reflectance (block 422), then no wavelength shift has occurred and no correction to the Raman peak positions is necessary. The measured position for the peaks of the Raman spectrum is returned as output and data collection continues (block 430).

As will be readily apparent to those of skill in the art, the order of the two comparisons in the combined calibration method 400 may be reversed. That is, the method 400 may proceed by first comparing the positions and then comparing the intensity. Similarly, all three of the various calibration methods 100, 200, 300 may be employed in different combinations and in any order. For example, such combinations could include real-time calibration of position and peak width, real-time calibration of intensity and peak width, and/ or real time calibration of position, peak width, and intensity.

A reference standard for stable reflectance is not required for every spectroscopy run. Once a reference standard is determined and saved, it may be used repeatedly, and may be updated at the user's discretion.

Some of the exemplary methods 100, 200, 300, 400 described herein include calculating adjustments to measured data and continuing with data collection. However, in some embodiments, upon detecting a significant deviation from the reference standard for stable reflectance, a method 100, 200, 300, 400 may instead return one or more error messages and/or cease data collection in lieu of determining and applying the adjustments.

One benefit of performing these calibrations is that the Raman peak height may be sued for quantitative data analysis, such as determining the molecular concentration of one or more components in a sample. For example, because the height of a Raman peak correlates to a particular shift at a specific location, an increase in peak height indicates an increase in the number of molecules present in the sample. To make quantitative determinations, the apparatus and methods described herein may be used in conjunction with a database library of calibration curves and their related equations for numerous substances. Furthermore, such a database may be extensible, with the Raman spectrometer apparatus 10 of embodiments of the present invention being used to directly create calibration curves for additional substances, which may be added to the library.

Although the process of creating a calibration curve and determining the equation therefore is within the capabilities of those of a skill in the art, such curves cannot be created with conventional Raman spectroscopy equipment, which do not use the unshifted return line in lieu of a measurement standard. The novel apparatus of this inventive Raman spectrometer apparatus 10 permits calibration curves to be assembled using the unshifted return line as an internal standard, thus decreasing the number of chemical components in the system, leading to reduced expenditures and more accurate data.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A Raman spectrometer, comprising:
    a light source operative to generate an excitation beam;
    a sample area operative to hold a sample such that the excitation beam impinges the sample;
    a wavelength dispersive device operative to spatially separate an optical signal reflected from or scattered by the sample into an unshifted return component having a first optical path and one or more Raman scattered components, each having optical paths separate from the first optical path;
    an optical detector operative to receive and detect optical signal components from the wavelength dispersive device; and
    an optical dampening element interposed between the wavelength dispersive device and the detector in a spatial position to intercept and attenuate the unshifted return component on the first optical path, and not to intercept and hence not attenuate a Raman scattered component on an optical path separate from the first optical path.

2. The spectrometer of claim 1 wherein the light source is operative to generate a collimated, temporally coherent, excitation light beam at a first wavelength.

3. The spectrometer of claim 1 wherein the Raman scattered components comprise one or more of Stokes scattered and anti-Stokes scattered photons.

4. The spectrometer of claim 1 wherein the wavelength dispersive device comprises a holographic transmission grating operative to separate an optical signal into components along separate optical paths by wavelength.

5. The spectrometer of claim 1 wherein the optical damping element comprises a neutral density optical filter.

6. The spectrometer of claim 1 wherein the optical damping element is selectively moveable over the detector.

7. The spectrometer of claim 1 further comprising a control circuit operative to control the detector and extract data therefrom, the control circuit including:
    one or more processors operative to process and analyze spectral data obtained from the detector;
    memory operative to store one or more of calibration data, measurement data, and analyzed data; and
    a user interface operative to receive command and control input and operative to output the results of data analysis.

8. A method of calibrating a Raman spectrometer for intensity fluctuations, the Raman spectrometer operative to attenuate an unshifted return component of an optical signal scattered by a sample and not attenuate a Raman scattered component of the optical signal, the method comprising:
    determining and storing a reference for standard reflectance of the sample;
    illuminating the sample with an excitation light beam;
    separating an optical signal scattered by the sample into an unshifted return component and one or more Raman scattered components;
    determining the position and intensity of a spectral peak corresponding to the unshifted return component of the optical signal;
    comparing the intensity of the unshifted return peak to the intensity of the reference; and
    determining, based on the comparison, whether adjustments to the intensity of spectral peaks corresponding to Raman scattered components of the optical signal are required.

9. The method of claim 8 wherein determining whether adjustments to Raman peaks are required comprises determining that adjustments are required if the difference between the intensity of the unshifted return peak and the intensity of the reference is greater than a predetermined threshold value.

10. The method of claim 8 further comprising, upon determining that intensity adjustments to Raman peaks are required:
    determining a ratio between the unshifted return peak intensity and the reference intensity; and
    adjusting the intensity of one or more spectral peaks corresponding to Raman scattered components of the optical signal using the determined ratio.

11. The method of claim 8 wherein the reference for standard reflectance of the sample is stored as a plurality of x-y coordinate pairs, where the y coordinate represents a number of photons detected at a detector pixel location.

12. The method of claim 11 wherein the x coordinate represents the detector pixel location converted to wave number.

13. The method of claim 11 wherein the x coordinate represents the detector pixel location converted to frequency.

14. The method of claim 11 wherein the y coordinate represents a number of photons detected at a detector pixel location converted to an intensity value.

15. The method of claim 8 further comprising:
    comparing the position of the unshifted return peak to the position of the reference; and
    determining, based on the comparison, whether adjustments to the position of spectral peaks corresponding to Raman scattered components of the optical signal are required.

16. The method of claim 15 further comprising, upon determining that position adjustments to Raman peaks are required:
  determining a frequency shift of the unshifted return peak with respect to the reference position; and
  adjusting the position of one or more spectral peaks corresponding to Raman scattered components of the optical signal using the determined frequency shift.

17. A method of calibrating a Raman spectrometer for frequency fluctuations, the Raman spectrometer operative to attenuate an unshifted return component of an optical signal scattered by a sample and not attenuate a Raman scattered component of the optical signal, the method comprising:
  determining and storing a reference for standard reflectance of the sample;
  illuminating the sample with an excitation light beam;
  separating an optical signal scattered by the sample into an unshifted return component and one or more Raman scattered components;
  determining the position and intensity of a spectral peak corresponding to the unshifted return component of the optical signal;
  comparing the position of the unshifted return peak to the position of the reference; and
  determining, based on the comparison, whether adjustments to the position of spectral peaks corresponding to Raman scattered components of the optical signal are required.

18. The method of claim 17 further comprising, upon determining that position adjustments to Raman peaks are required:
  determining a frequency shift of the unshifted return peak with respect to the reference position; and
  adjusting the position of one or more spectral peaks corresponding to Raman scattered components of the optical signal using the determined frequency shift.

19. The method of claim 17 further comprising:
  comparing the intensity of the unshifted return peak to the intensity of the reference; and
  determining, based on the comparison, whether adjustments to the intensity of spectral peaks corresponding to Raman scattered components of the optical signal are required.

20. The method of claim 19 further comprising, upon determining that intensity adjustments to Raman peaks are required:
  determining a ratio between the unshifted return peak intensity and the reference intensity; and
  adjusting the intensity of one or more spectral peaks corresponding to Raman scattered components of the optical signal using the determined ratio.

21. A method of calibrating a Raman spectrometer for peak width, the Raman spectrometer operative to attenuate an unshifted return component of an optical signal scattered by a sample and not attenuate a Raman scattered component of the optical signal, the method comprising:
  determining and storing a reference for standard reflectance of the sample;
  illuminating the sample with an excitation light beam;
  separating an optical signal scattered by the sample into an unshifted return component and one or more Raman scattered components;
  determining the width of a spectral peak corresponding to the unshifted return component of the optical signal;
  comparing the width of the unshifted return peak to that of the reference; and
  determining, based on the comparison, whether the spectrometry run should be terminated with an error.

* * * * *